Patented Jan. 10, 1933

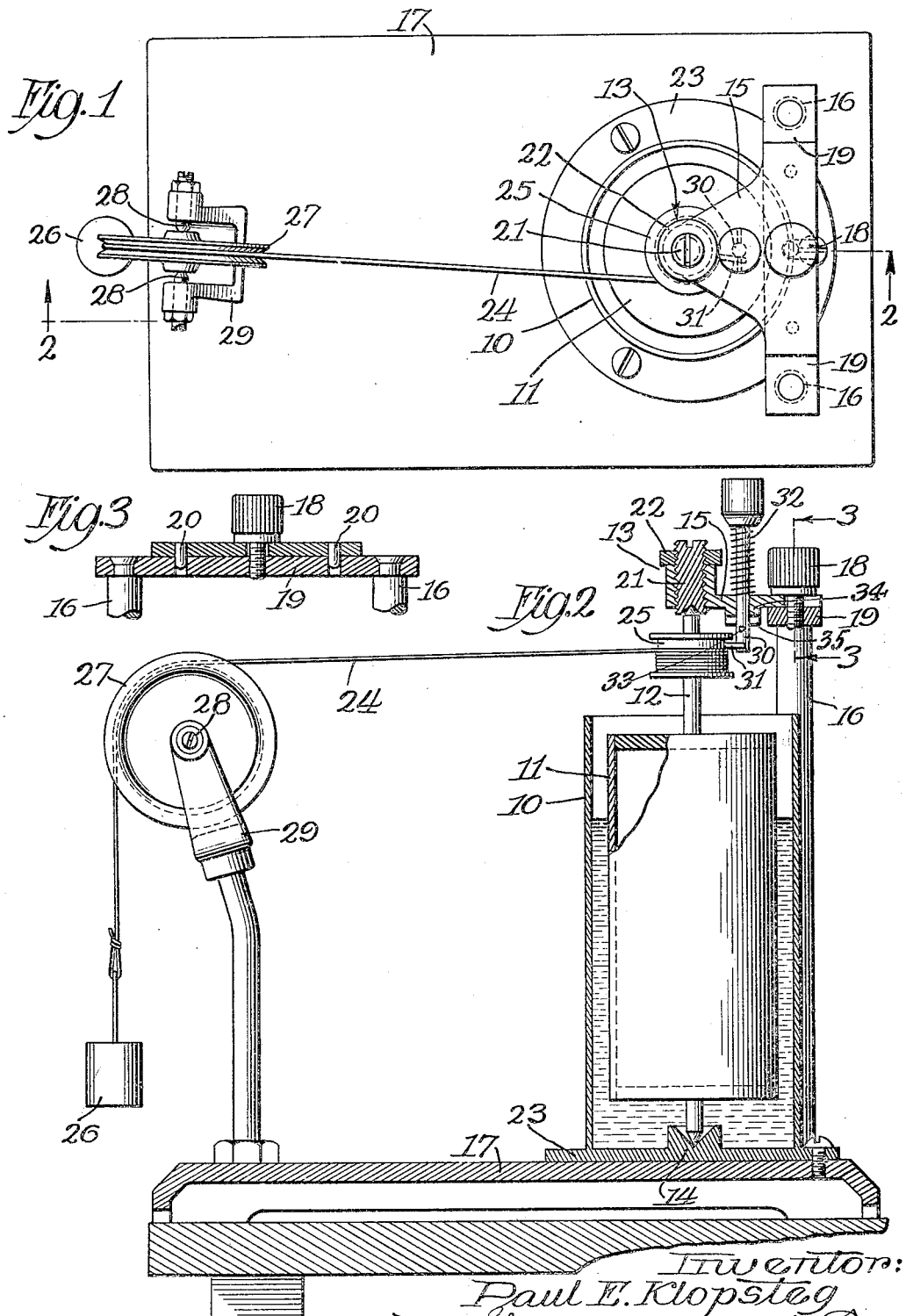

1,893,749

UNITED STATES PATENT OFFICE

PAUL E. KLOPSTEG, OF CHICAGO, ILLINOIS, ASSIGNOR TO CENTRAL SCIENTIFIC COMPANY, A CORPORATION OF ILLINOIS

VISCOSITY APPARATUS

Application filed September 27, 1929. Serial No. 395,729.

This invention relates to viscosity apparatus, and, among other objects, aims to provide a simple apparatus for studying and comparing the viscosity of liquids and for demonstrating and studying the laws governing viscosity.

The nature of the invention may be readily understood by reference to one apparatus embodying the invention and illustrated in the accompanying drawing, in which:

Fig. 1 is a plan view of the apparatus;

Fig. 2 is a sectional elevation thereof taken on the line 2—2 of Fig. 1; and

Fig. 3 is a vertical section of a detail of the removable upper bearing structure, taken on the line 3—3 of Fig. 2.

The illustrative apparatus is designed to study the viscosity of liquids from the standpoint of the following definition, namely, the viscosity of a liquid is the tangential stress in unit area per unit of relative velocity between two surfaces separated by unit distance, the space between such surfaces being filled with the liquid in question.

The surfaces recited in the definition are embodied, in this instance, in coaxial cylindrical surfaces 10 and 11 in the form of outer and inner cylinders respectively. The inner cylinder is provided with plane surfaces at its top and bottom and is mounted on a shaft 12 whose conical ends are seated in upper and lower conical bearings 13 and 14, respectively. The upper bearing is carried by a bracket, 15 removably mounted on a support in the form of a pair of posts 16 extending upwardly from the apparatus base 17. A thumb screw 18 removably clamps the bracket 15 to the crosspiece 19 supported on the tops of the posts and dowell pins 20 insure the centering of the upper bearing with relation to the cylinder 10. The removability of the upper bearing permits convenient cleaning and measurement of the cylinders. The screw 21 in which the upper bearing seat is formed permits the adjustment of the bearing to secure minimum friction. A lock nut 22 maintains such adjustment.

The outer cylinder which forms the receptacle for the liquid to be tested, is mounted upon base 17, by means of flanges 23 so that the lower bearing 14 (which in this case is formed integral with the bottom of the cylinder) will be in vertical alinement with the upper bearing.

Means in the form of a flexible tension member 24 such as a piece of silk fish-line, is provided for exerting a uniform torque on the inner cylinder to secure relative movement between the surfaces of the cylinders 10 and 11. The line 24 makes its driving connection with cylinder 11 through a drum 25 mounted on shaft 12 and a constant force is applied thereto, in this case by means of an appropriate weight 26 which hangs downwardly from the pulley 27 over which the string passes. The drum 25 is made sufficiently large to receive an adequate length of string without building it up thereon to such an extent as to change the effective turning moment applied to the cylinder. The pulley 27 is supported by conical bearings 28 in bracket 29, the latter being mounted on base 17.

Friction on the bearings is reduced to a negligible quantity by constructing the hollow inner cylinder with an average density (i. e. the total mass of the cylinder divided by its total volume) which approximates the densities of the liquids to be tested. The buoyancy of the liquids will then have the effect of rendering the cylinder weightless, so to speak, and in this way minimizing bearing friction.

The amount of torque exerted on the string 24 may be adjusted (by proper selection of weights) to the viscosity of the liquid tested in order that the angular velocity of the rotating cylinder will not be too great nor yet too slow.

The need for such adjustment becomes apparent when it is considered that the viscosity of a heavy automobile oil is about fifteen hundred to two thousand times as great as water at the same temperature.

The illustrative apparatus is primarily intended, and, no doubt, will find its greatest pedagogical value in comparative work, although absolute values for viscosity may readily be ascertained from the apparatus, if desired. This latter application of the apparatus, however, usually forms a basis for the more advanced students.

The necessary data for deriving the relative viscosities of various selected fluids may be obtained in a manner somewhat as follows: A selected fluid is allowed to fill the space between the two cylinders and its level is carefully noted. Thereupon a suitable weight is placed upon the end of the flexible member 24 but the rotation of the inner cylinder is advantageously delayed, until the operator is ready to make the necessary observations, by means of a spring released pin 30 which engages a finger 31 projecting from the drum 25. The pin is normally held in its lowermost position by a cross pin 33 which engages a boss 34 on the lower side of the upper pivot bracket. When the operator is ready to release the stop, the pin 30 is rotated until the cross pin is alined with a slot 35 in the boss whereupon a spring 32 forces the pin upwardly out of engagement with the finger 31 projecting from the drum. The operator then observes by use of a suitable timing mechanism, such as a stop watch, the time interval in which the weight falls through a given distance. In practice the operator usually will note the time required for the weight to fall from its initial position to the floor, the initial height of the weight from the floor being easily ascertained. Thereafter he will use one or more different weights and make similar observations of the time required for the weight to fall through the same distance. Having these values he will then compute the peripheral velocity of the inner cylinder for each of these observations and plot these values against the corresponding torque acting upon the inner cylinder for each of the weights.

The resultant graphical representation from plotting peripheral velocity against torque will be a straight line for a given liquid. Other liquids are thereafter tested in the same manner being careful to bring them to approximately the same level within the cylinders as the first liquid tested, and a similar graphical representation is made. The fact that the lines converge at their origin teaches that the bearing friction is negligible and need not ordinarily be considered. In this way, the relative viscosities of various selected liquids may be readily ascertained and visually demonstrated.

Inasmuch as the inner cylinder is readily removable from its operative position the necessary data for computing the peripheral velocity of the cylinder may be easily obtained, as well as the data required concerning the drum in order to determine the constant torque which is being applied to the inner cylinder during a given observation.

It is assumed that the liquids tested in the illustrative apparatus are of a character to wet the cylindrical surfaces.

As stated before, the apparatus may be used for determining the absolute viscosity of a given liquid, but in such experiments it is necessary to take into consideration various other factors, such as the end correction for the base of the inner cyilnder, inertia and the like.

Obviously the invention is not limited to the details of the illustrative apparatus since these may be variously modified.

Moreover, it is not indispensable that all features of the invention be used conjointly, since various features may be used in different combinations and subcombinations.

I claim as my invention:

1. In apparatus of the class described, a base, a cylindrical receptacle mounted on the base, a hollow cylinder concentrically arranged within the receptacle for rotation relative thereto, a post rising from the base, a bodily removable pivot bearing carried by the post providing a mounting for the inner cylinder, means for applying different known forces to rotate the cylinder, and a releasable stop for holding the cylinder stationary preparatory to operating the apparatus.

2. In apparatus of the class described including a rotatable cylinder within a fixed cylindrical reservoir, the combination of a support adjacent the reservoir, a pivot bearing removably carried by the support, and means associated with the support for centering the bearing relative to the axis of the reservoir.

3. In apparatus of the class described, a base, a cylindrical fluid reservoir removably secured to the base and providing a bearing in the bottom thereof, a rotatable cylinder concentrically arranged within the reservoir and supported upon said bearing, an upper pivot bearing, means for removably supporting the pivot bearing above the reservoir to provide a mounting for the rotatable cylinder, and means for centering the pivot bearing with respect to the axis of the reservoir.

4. In apparatus of the class described, a base, a cylindrical fluid reservoir rigidly secured to the base and having an axial bearing on the inner face of its base, a rotatable cylinder concentrically arranged within the reservoir and mounted upon said bearing, a drum rigidly connected to the cylinder and positioned along the axis of the cylinder, a projection on the drum, means for applying different known rotational forces through the drum to rotate the cylinder, and a spring releasable stop engaging the projection on the drum for holding the cylinder stationary preparatory to operating the apparatus.

5. Viscosity apparatus comprising in combination a relatively fixed cylindrical receptacle adapted to receive a liquid whose viscosity is to be observed, a rotatable cylindrical member inside said receptacle, upper and lower bearings for supporting said member coaxially with the receptacle, means permitting said upper bearing to be bodily lifted from its position to permit free removal of the member for inspection and measurement, and means for applying a known torque to the rotatable cylinder whereby the peripheral velocity of the rotating cylinder may be quantitatively ascertained.

6. Viscosity apparatus comprising in combination, a liquid receptacle having an inner cylindrical surface and adapted to hold a liquid, a cylindrical member inside said receptacle, bearings for supporting said member concentric with said receptacle, one of the bearings being removable, an axial shaft for said member mounted on said bearings, a drum on said shaft, means for applying a turning moment to said drum, and releasable means for holding the drum against rotation by the turning moment and for stopping said drum.

7. Viscosity apparatus comprising in combination, a stationary cylindrical receptacle, a concentric cylinder within the stationary receptacle, bearings for rotatably supporting the inner receptacle, said inner cylinder having an average density approximating the densities of the liquids whose viscosities are to be tested by the apparatus.

8. Viscosity apparatus comprising in combination, a stationary cylindrical receptacle, a concentric hollow cylinder within the stationary receptacle, bearings for rotatably supporting the inner receptacle, said inner cylinder having an average density approximating the densities of the liquids whose viscosities are to be tested by the apparatus.

In testimony whereof I affix my signature.

PAUL E. KLOPSTEG.